(12) United States Patent
Evans

(10) Patent No.: US 6,685,243 B1
(45) Date of Patent: Feb. 3, 2004

(54) BUMPER FOR REDUCING PEDESTRIAN INJURY

(75) Inventor: Darin Evans, Wixom, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 10/208,300

(22) Filed: Jul. 30, 2002

(51) Int. Cl.$^7$ ............................................ B60R 19/18
(52) U.S. Cl. ...................................... 293/102; 293/121
(58) Field of Search ..................... 293/15, 102, 120, 293/121, 126, 154

(56) References Cited

U.S. PATENT DOCUMENTS

| | | |
|---|---|---|
| 4,165,113 A | 8/1979 | Casse |
| 4,221,413 A | 9/1980 | Bonnetain |
| 4,320,913 A | 3/1982 | Kuroda |
| 4,856,833 A | 8/1989 | Beekman |
| 4,940,270 A | 7/1990 | Yamazaki et al. |
| 4,978,562 A | 12/1990 | Wycech |
| 5,005,887 A | 4/1991 | Kelman |
| 5,092,512 A | 3/1992 | Sturrus et al. |
| 5,124,186 A | 6/1992 | Wycech |
| 5,139,297 A | 8/1992 | Carpenter et al. |
| 5,219,197 A | 6/1993 | Rich et al. |
| 5,290,078 A * | 3/1994 | Bayer ........................ 293/120 |
| 5,425,561 A | 6/1995 | Morgan |
| 5,545,022 A | 8/1996 | Rosasco |
| 5,545,361 A | 8/1996 | Rosasco |
| 5,799,991 A | 9/1998 | Glance ........................ 293/121 |
| 5,988,713 A * | 11/1999 | Okamura et al. ........... 293/120 |
| 6,165,588 A | 12/2000 | Wycech |
| 6,217,089 B1 | 4/2001 | Goto et al. |
| 2001/0017473 A1 | 8/2001 | Yamamoto |

FOREIGN PATENT DOCUMENTS

| | | | |
|---|---|---|---|
| JP | 0172848 | * 10/1982 | .................. 293/120 |
| JP | 404218445 | * 8/1992 | .................. 293/120 |

* cited by examiner

Primary Examiner—Dennis H. Pedder
(74) Attorney, Agent, or Firm—Price, Heneveld, Cooper, DeWitt & Litton, LLP

(57) ABSTRACT

A vehicle bumper system includes a beam, and an energy absorber with top and bottom horizontal sections and a mid-horizontal section. The horizontal sections form top and bottom nose portions that are semi-rigid but initially collapsible with a parallelogram motion that shifts the top and bottom portions vertically up (or down) upon impact. Horizontal impact forces are converted in part to vertical forces during an initial stroke of a frontal impact, "catching" an impacted human being. Then during a further continuing impact stroke, the top and bottom horizontal sections provide a "throwing" action. End sections of the energy absorber extend around ends of a bumper beam, forming a collapsible corner that, during impact, initially absorbs energy at a low rate to "catch" a person, and then develops increasing lateral forces that "throw" the person during a continuing impact stroke.

5 Claims, 5 Drawing Sheets

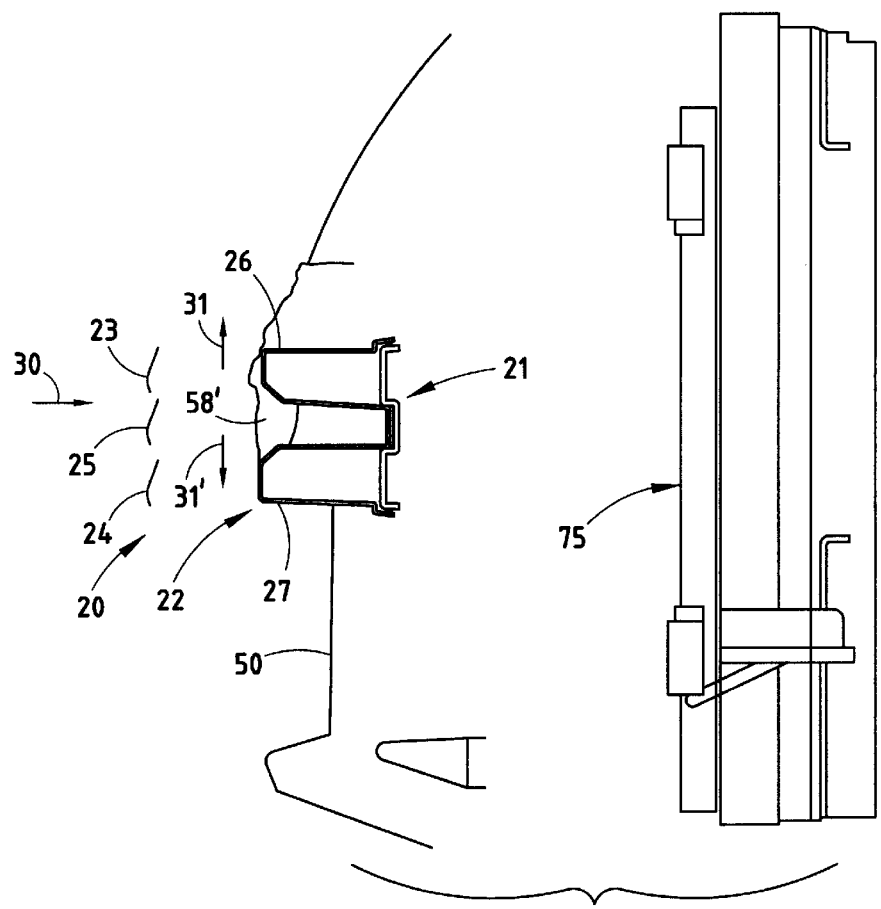
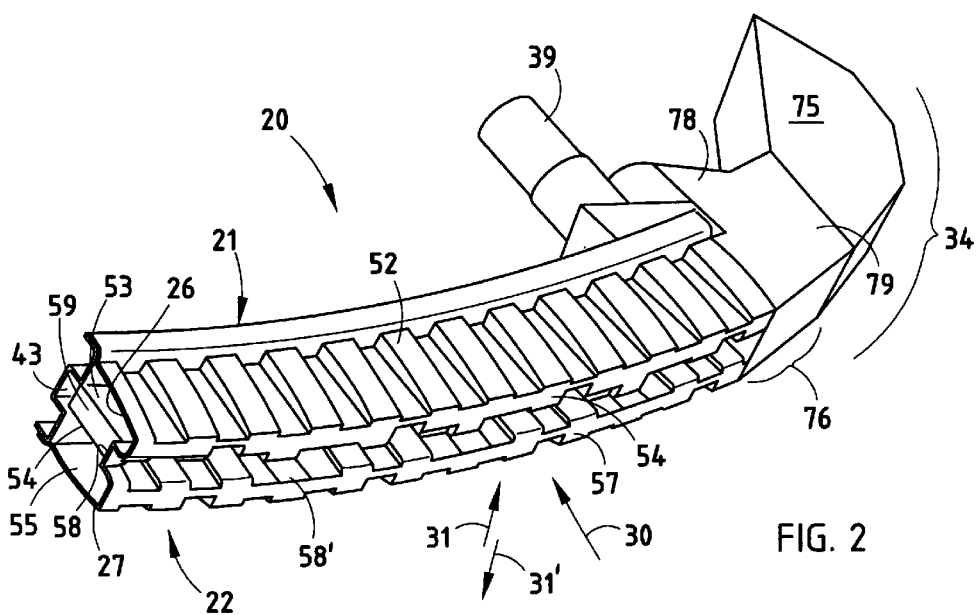

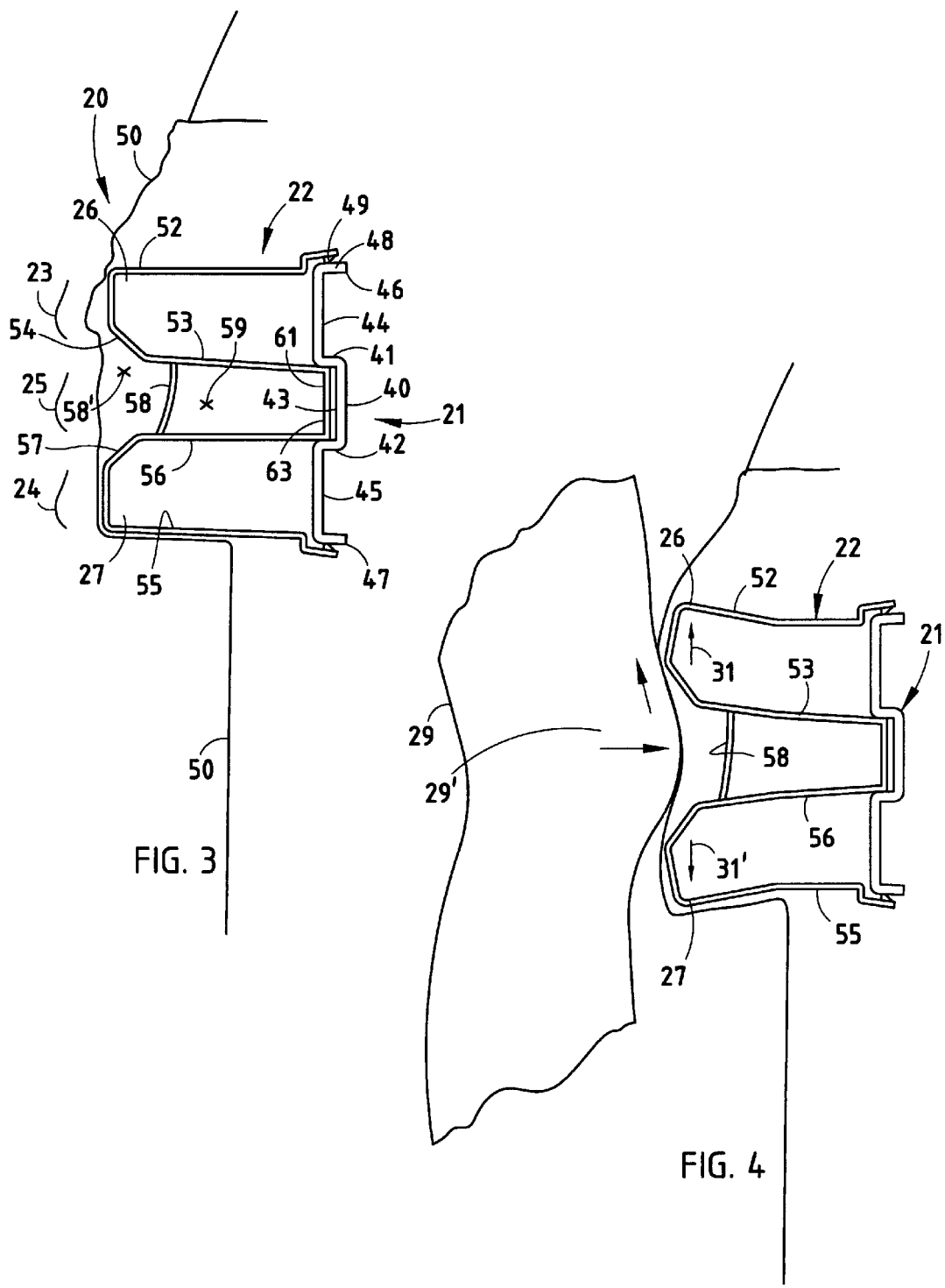

BUMPER FOR REDUCING PEDESTRIAN INJURY

BACKGROUND

The present invention relates to bumpers for passenger vehicles designed to reduce pedestrian injury upon impact, and more particularly relates to a bumper having an energy absorber optimized to provide a relatively soft initial impact and a "throwing" force after initial impact to a pedestrian struck by the bumper.

Automotive bumper systems in the United States have been designed for resistance to damage at low and high vehicle speeds and for high-energy absorption at high impact speeds. Recently, pedestrian safety has begun to receive increasing attention. However, design of bumpers for pedestrian safety is complicated by several conflicting functional requirements. Obviously, the human body cannot withstand high-energy impacts nor sharp impacts without substantial damage to muscle and bone tissue. However, it is difficult to reduce the magnitude and rate of energy transfer from a bumper to a pedestrian upon impact, especially immediate transfer of energy from a "sharp" impact, because vehicle bumpers are usually limited to a relatively short stroke by components behind the bumper, such as a radiator and other engine components, and also limited by other front-end components and supporting structure. This is especially true of smaller and more compact vehicles. Further, the bumpers must be made of strong materials in order to maintain their shape and appearance over time, and to provide their primary function of being a "bumper" for the vehicle to push away items and to prevent damage to the vehicle. The problems are further complicated by aerodynamic designs, where corners of the bumper system are swept and curved back into the vehicle fenders, which further limits bumpers strokes and the bumper's ability to collapse or flex. Also, the problem is compounded by the fact that bumpers are at knee-height, such that pedestrian-related vehicular accidents often involve trauma to the pedestrian's knees. Joints and exposed bones are particularly prone to injury upon impact.

Accordingly, a bumper system is desired solving the aforementioned problems and having the aforementioned advantages.

SUMMARY OF THE PRESENT INVENTION

In one aspect of the present invention, a bumper system for a vehicle includes a beam adapted for attachment to a vehicle, and an energy absorber engaging a face of the beam. The energy absorber has a top horizontal section defined by a top wall and an upper-mid wall connected by an upper-front wall, and also has a bottom horizontal section defined by a bottom wall and a lower-mid wall connected by a lower-front wall, and still further has a middle horizontal section defined by a mid-front wall connecting the upper-mid wall and the lower-mid wall. The top and bottom horizontal sections include top and bottom front nose portions that extend forward of the mid-front wall and that define a horizontal channel therebetween in front of the mid-front wall. The front nose portions are configured to provide a first level of energy absorption during an initial impact stroke that collapses one or both of the front nose portions, with the top, middle, and bottom horizontal sections providing a higher second level of energy absorption during a continuing impact stroke that collapses the energy absorber against the face of the beam. A fascia covers the energy absorber and the beam. By this arrangement, during an initial front impact stroke, the top and bottom front nose portions provide a relatively low-energy absorption that "catches" an impacted object such as a knee of a human being, and then during a further continuing impact stroke, the top, middle, and bottom horizontal sections crush to provide an increased energy absorption.

In another aspect of the present invention, a bumper system for a vehicle includes a beam adapted for attachment to a vehicle and having a longitudinal curvature that, when viewed from above in a vehicle-mounted position, is shaped to match an aerodynamic curvilinear shape of a front of the vehicle. The bumper system further includes an energy absorber engaging a face of the beam. The energy absorber has a top horizontal section defined by a top wall and an upper-mid wall connected by an upper-front wall, and has a bottom horizontal section defined by a bottom wall and a lower-mid wall connected by a lower-front wall, such that the top and bottom horizontal sections including top and bottom front nose portions that extend forwardly. The top and bottom nose portions each are semi-rigid but are collapsible with a parallelogram motion that shifts one or both of the top and bottom front walls vertically, such that horizontal impact forces are converted at least in part to a vertical force upon receiving a horizontal frontal impact during an initial stroke of the frontal impact. By this arrangement, during a first part of the frontal impact, the top and bottom front nose portions provide a relatively low-energy absorption that "catches" an impacted object such as a knee of a human being, and then during a further continuing impact stroke, the top and bottom horizontal sections crush to provide an increased energy absorption.

In yet another aspect of the present invention, a bumper system for a vehicle includes a beam adapted for attachment to a vehicle and having a curvilinear longitudinal shape when viewed from above in a vehicle-mounted position, the beam including mounts positioned at ends of the beam. An energy absorber engages a face of the beam. The energy absorber has a middle section engaging the face and further has end sections that extend outwardly from the middle section and at least partially around the associated ends of the beam. The end sections each have an enlarged free end portion and a transition portion connecting the free end portion to an end of the middle section. Each of the transition portions of the end sections of the energy absorber, during a first part of a bumper stroke caused by a corner impact, are constructed to provide a relatively low-energy absorption and further are configured to torsionally crush so that the enlarged free end portion swings rearward and "catches" an impacted object such as a knee of a human being, and then during a further continuing part of the bumper stroke, the transition portion provides increased energy absorption and counteractive forces such that the free end portion pushes the impacted object away both due to lateral resistive forces developed in the energy absorber non parallel a line of impact and also due to sliding of the impacted object along an inclined surface of the free end portion.

In still another aspect of the present invention, a method comprises steps of constructing a bumper system including a stiff beam, and an energy absorber on a face of the beam. The energy absorber has top, middle, and bottom sections, with the top and bottom sections defining nose portions that extend forward of the middle section. The nose sections define a space therebetween in front of the middle section, the top and bottom nose sections being constructed to deflect with a parallelogram motion upon impact and that shift at least one of the nose portions vertically with a parallelogram motion in response to an impact directed horizontally against a front of the bumper system, whereby energy directed against a knee of an impacted person is converted into a throwing force that directs the person in a direction generally perpendicular to the line of impact and away from the vehicle bumper system.

The objects of the present invention include providing a bumper system adapted to initially "catch" a person during an initial phase of impact, with less energy and forces being transmitted to the person and/or the forces being transmitted at a slower rate during the initial phase, and hence less injury being likely. The objects further include re-orienting the impact forces transmitted to the person from a line parallel the direction of impact to a direction upward or downward (in the case of a front impact) or laterally (in the case of a corner impact). By these actions, the impacted person is initially "caught" and then "thrown" in a direction away from the line of impact, thus reducing injury and also reducing damage to the vehicle bumper system.

These and other aspects, objects, and features of the present invention will be understood and appreciated by those skilled in the art upon studying the following specification, claims, and appended drawings.

BRIEF DESCRIPTION OF DRAWINGS

FIG. 1 is a side elevational view of a bumper system on a vehicle embodying the present invention;

FIG. 2 is a perspective view of the bumper system shown in FIG. 1;

FIGS. 3–5 are enlarged views of the bumper system shown in FIG. 1, FIG. 3 showing the bumper system before a frontal impact against a person's knee and leg, FIG. 4 showing the bumper system during an initial part of the frontal impact against the knee and leg, and FIG. 5 showing the bumper system during a continuing part of the frontal impact;

DETAILED DESCRIPTION OF PREFERRED EMBODIMENTS

Figure 5:
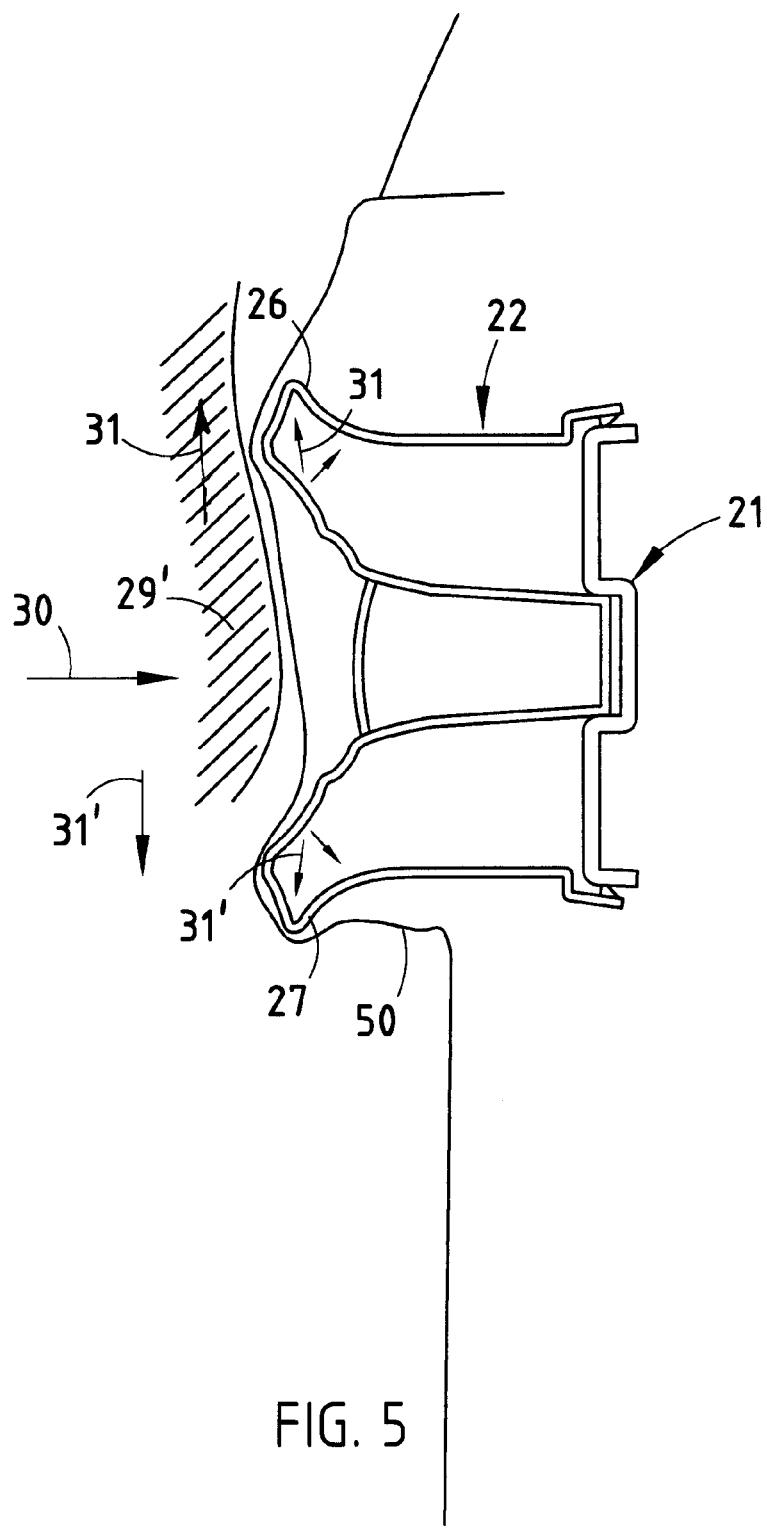

A vehicle bumper system 20 (FIGS. 1–2) includes a beam 21, and an energy absorber 22 with top and bottom horizontal sections 23, 24, and a middle horizontal section 25. The top and bottom horizontal sections 23–24 form top and bottom nose portions 26 and 27 that are semi-rigid but collapsible with a parallelogram motion that shifts the top and bottom portions 26 and 27 vertically up (or down) upon impact. As a result, horizontal impact forces 30 are converted in part to vertical forces 31 during an initial stroke of a frontal impact (FIG. 4), in effect "catching" the knee 29' (FIG. 4) of a human 29 during a collision. Upon a continuing impact stroke (FIG. 5), the top and bottom horizontal sections 23–24 provide a "throwing" action, as shown by increasing forces 31 and 31'. During the continuing impact stroke, the horizontal sections 23–25 also crush and provide increased energy absorption, as shown by FIG. 5. The combination of these forces 31 and 31' "throw" the impacted human 29 upward in a direction off the bumper beam 21. A majority of the force 31 is upward due to a majority of the person's weight being above the person's knees. However, it is noted that there is a component of downward vertical forces 31', as shown in FIG. 5.

A length of the energy-absorbing stroke of the bumper system 20 (FIG. 6) is extended by use of the beam 21, which has a shallow cross section that takes up less space due to its small depth. Specifically, the beam 21 has a height-to-depth ratio of at least about 3:1, and more preferably of at least about 4:1 or greater, such that the beam 21 flexes and deforms more readily than many existing bumper beams. A shallowness of the beam reduces the amount of space taken up by the beam 21 in front of the radiator of the vehicle, and also the combination of the energy absorber 22 and the dynamics of the energy absorption upon impact and crush cause the beam 21 to flex to "catch" a person with a hammock-like action, thus providing reduced injury to pedestrians upon impact. Further, due to the increased stroke, the energy absorption is not decreased an unacceptable amount for many vehicles. It is noted that, although the beam 21 can be bent with a "hammock-like action", the beam 21 has considerable strength, such that it flexes and deforms only upon substantial impact and forces being generated. Further, these functional characteristics can be varied by design of the bumper system 20, as discussed below.

Figure 8:
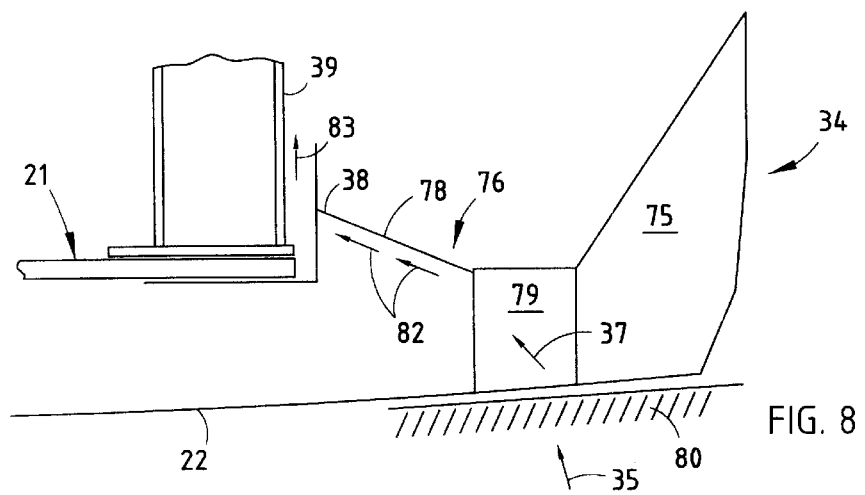
FIGS. 8–10 are schematic plan views of a corner impact sequence, FIG. 8 showing the corner of the bumper system immediately prior to corner impact, FIG. 9 showing the corner during an initial part of the corner impact, and FIG. 10 showing the corner during the continuing part of the corner impact.
Figure 9:
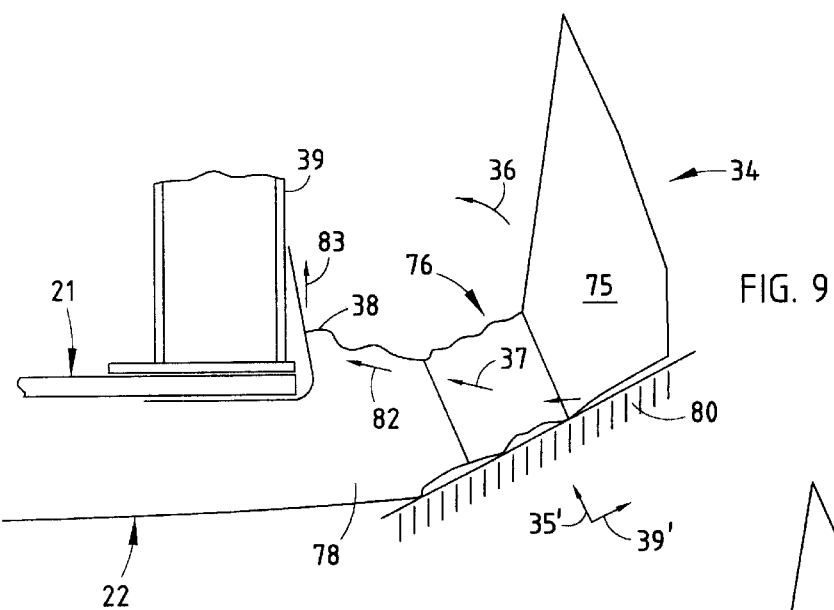
Figure 10:
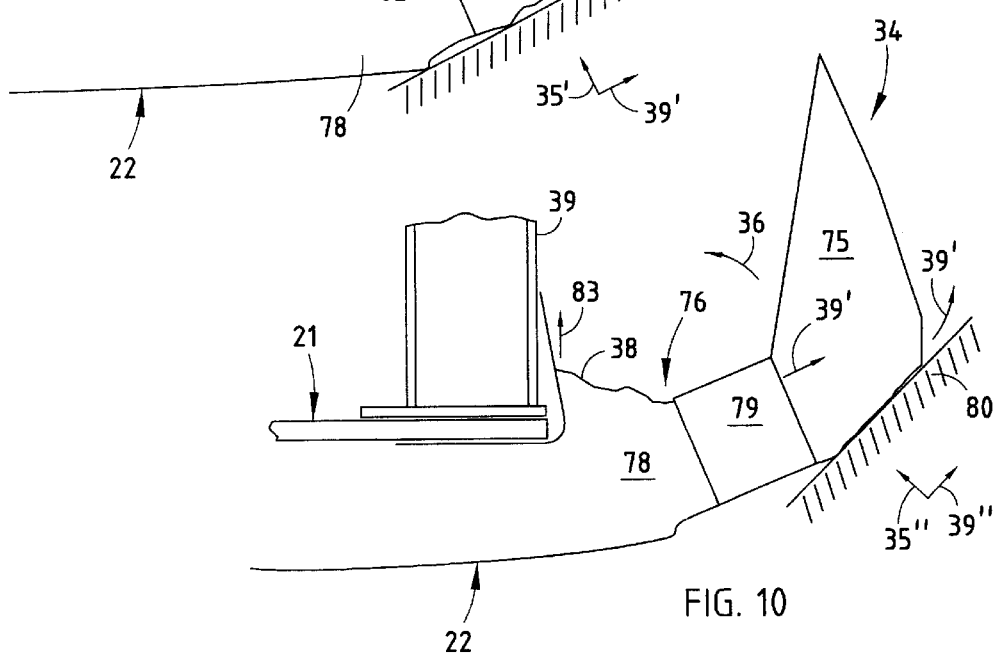

The energy absorber 22 also has end sections 34 (FIG. 8) that extend around ends of the bumper beam 21, forming a collapsible corner that, during impact, initially absorbs energy at a relatively low rate from forces of impact 30 such that it basically "catches" an impacted person. During the initial impact stroke (FIG. 9), the end section 34 also torsionally collapses in direction 36 as it absorbs energy along the lines 37, with a rear portion 38 of the energy absorber 22 slidingly engaging a side of the mount 39. During the continuing impact stroke (FIG. 10), the energy absorber 22 develops increasing lateral forces that "throw" the person in a direction 39' sideways away from the vehicle during the continuing impact stroke.

The illustrated beam 21 (FIG. 3) is a roll-formed channel, and includes a transverse cross section defining a back-and-forth snake-like shape. It is contemplated that other channels can be used, such as extruded or stamped channels, or molded channels, and further that different cross-sectional shapes can be used without departing from a scope of the present invention. The present cross section includes a center wall 40; opposing transverse flanges 41, 42 that extend forwardly from each edge and define a channel 43; top and bottom walls 44, 45 that extend upwardly and downwardly from flanges 41, 42, respectively; and top and bottom edge flanges 46, 47 that extend rearwardly from top and bottom walls 44, 45, respectively. The front face of beam 21 defines a shape adapted to mateably engage a rear surface of the energy absorber 22, with the channel 43 engaging a ridge 63 on the energy absorber 22 to provide an "anchor" for preventing the energy absorber 22 from sliding up over the beam 21 (or down under the energy absorber 22)

during a front impact. Apertures or detents 48 are formed in the top and bottom edge flanges 46, 47, for receiving protruding hooks 49 on the energy absorber 22 to temporarily hold the energy absorber 22 on the beam 21 during subassembly. In assembly, a fascia 50 is positioned on the bumper system 20, either before or during assembly of the bumper system 20 to a vehicle.

The top horizontal section 23 of the energy absorber 22 (FIG. 3) includes a top wall 52 and an upper-mid wall 53 connected by an upper-front wall 54. The bottom horizontal section 24 includes a bottom wall 55 and a lower-mid wall 56 connected by a lower-front wall 57. The mid-horizontal section 25 includes a mid-front wall 58 that connects the upper-mid wall 53 and the lower-mid wall 56. The mid-front wall 58 is recessed rearwardly from the front walls 54 and 57 about an inch-and-a-half or two inches, such that the top and bottom nose sections 26 and 27 protrude forwardly of the mid-front wall 58. Further, the half of front walls 54 and 57 that are closest to wall 58 are angled inwardly to form an enlarged "mouth" or entrance to the channel 58', as described below. Further, the mid-front wall 58 has rectangular apertures formed therein. Vertical/fore/aft reinforcing walls 59 extend transversely between the walls 52, 53, 55, 56 at edges of the apertures and form box-like sections with walls 52, 53, 55, 56 that act to stabilize the walls relative to each other. The walls 52–59 can be continuous to form a solid grid of honeycomb shapes, or can be discontinuous and/or include apertures. By making these variations, different impact strengths and energy absorbing characteristics can be achieved in the energy absorber 22. Also, material composition and wall thicknesses can be varied to provide different energy absorbing characteristics.

When the energy absorber 22 is in a vehicle-mounted position, the walls 52, 53, 55, 56 extend generally in a horizontal plane and from side to side of the vehicle. The walls 52, 53, 55, 56 as illustrated extend in a fore/aft direction and are wave shaped or corrugated for increased impact strength, but it is contemplated that other shapes for the walls are possible. The front walls 54 and 57 extend generally vertically and are coplanar and parallel, with the exception that they include angled portions that lead into channel 58', and further, they are curved when viewed from above to match an aerodynamic front shape of the vehicle. The mid-front wall 58 wall extends generally parallel to the front walls 54 and 57, but is spaced rearwardly about an inch-and-a-half or two inches. By this arrangement, it connects the top and bottom nose portions 26 and 27 to stabilize the nose portions 26 and 27, but so that the nose portions 26 and 27 are able to flex independently with a parallelogram motion (compare FIGS. 3–5). The illustrated mid-front wall 58 has rectangular apertures 60 formed therein that are periodically located along the mid-front wall 58. The apertures 60 are bounded by walls 53 and 55 on their top and bottom, and are bounded by vertical walls 59 on their side edges, such that walls 53, 55, and 59 form box-shaped sections around each aperture 60. A rear wall 61 is formed along a rear of the energy absorber 22. The rear wall 61 along with a rear half inch of the walls 53, 54, 55, 56 forms the ridge 63 that mateably engages the channel 43 on the beam 21. The rear wall 61 is aligned with each of the apertures 60, so that the molding die for making the energy absorber 22 can be made without pulls and cams and without moving die parts for making blind surfaces.

The top and bottom front nose portions 26 and 27 extend forward of the mid-front wall 57 and define a horizontal channel 58' therebetween in front of the mid-front wall 57. The front nose portions 26 and 27 are configured to provide a first level of energy absorption during an initial impact stroke that collapses one or both of the front nose portions 26 and 27 with a parallelogram-like motion. (Compare FIGS. 34). Notably, the parallelogram-like motion provides some energy absorption due to the crumpling effect of the parallelogram motion on the reinforcing walls 59 and also due to the bending forces absorbed by walls 53, 54, 56, and 57. However, a focus of the forces is in the parallelogram action of the nose portions 26 and 27 in combination with a columnar strength of the walls 53, 54, 56, 57, which results in a significant percentage of the horizontal forces of initial impact being converted into vertical forces 31. Initially, a pedestrian's knee 29' enters the channel 58' and strikes nose portions 26 and 27, causing them to deflect vertically (FIG. 4). As the impact stroke continues (FIG. 5), the top, mid and bottom horizontal sections 23–25 provide a higher second level of energy absorption as the energy absorber 22 crushes and collapses against the face of the beam 21.

Figure 6:
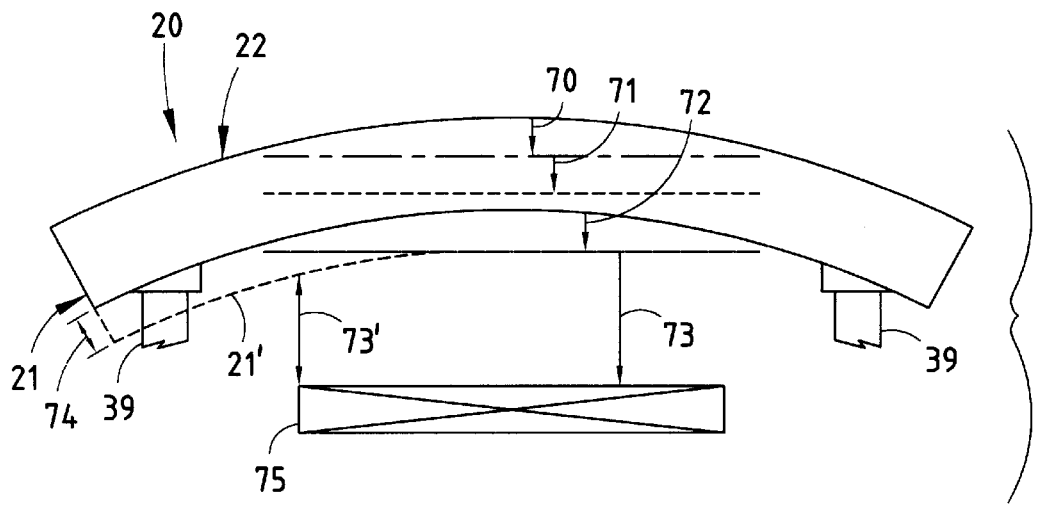
FIG. 6 is a plan view of the bumper system shown in FIG. 1, including a phantom line showing an initial collapse/deflection of the nose portions of the energy absorber, a dashed line showing secondary crushing of the energy absorber, and a dash-dot-dash line showing deformation of the bumper beam to a straightened condition, FIG. 6 also showing a dotted line depicting the result of using the present energy absorber with a highly rigidified beam that does not collapse nor substantially deform.
Figure 7:
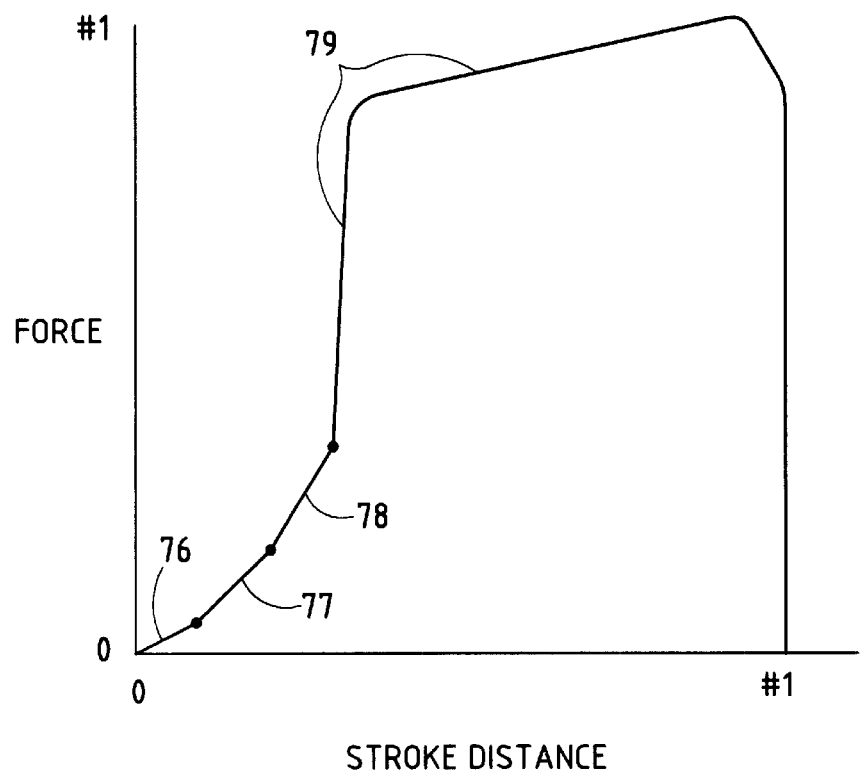
FIG. 7 is a force-deflection curve showing energy absorption during an impact against the bumper system of FIG. 1.

FIGS. 6–7 illustrate a second way in which the present bumper system provides reduced injury to pedestrians. In the present bumper system 20 (FIG. 6), the impact results in sequential deflection distances 70, 71, 72, and 73. Upon impact, the nose portions 26 and 27 of the energy absorber 22 initially bend with a parallelogram-type motion, which results in deflection of a front face of the bumper system a rearward distance 70. As the impact continues, the energy absorber 22 is crushed against a face of the beam 21 an additional distance 71. As the impact continues, the beam 21 is deformed an additional distance 72 toward a straightened condition between the vehicle mounts 39. The last distance 73 represents a distance of deflection as the mounts 39 telescopingly crush/collapse, and as the bumper beam 21 and energy absorber 22 are driven rearwardly toward the vehicle radiator 75. The distances 70–73 are represented on the graph of FIG. 7 by line segments 76–79, with energy absorption being represented by the area under the curve formed by the line segments 76–79. It is noted that the energy absorber 22 can be used on a tubular rigid beam 21' that does not tend to bend, but in such event, the bumper system would take up a dimension 74 and also would only collapse a total of distances 70, 71, and 73' (since the beam 21' would not bend straight).

As noted above, the energy absorber 22 is adapted for corner impact by incorporating of the end sections 34 (FIG. 8) that extend around ends of the bumper beam 21. The end sections 34 form a collapsible corner that, during impact, initially absorbs energy at a relatively low rate from forces of corner impact 35 such that it basically "catches" a knee of an impacted person. During the initial impact stroke (FIG. 9), the end section(s) 34 also torsionally collapse in direction 36 as it absorbs energy along the lines 37, with a rear portion 38 of the energy absorber 22 slidingly engaging a side of the mount 39. During the continuing impact stroke (FIG. 10), the energy absorber 22 develops increasing lateral forces in direction 39' that "throw" the person sideways away from the vehicle during the continuing impact stroke.

More specifically, the end section 34 of the energy absorber 22 includes an enlarged free end portion 75 and a transition portion 76 connecting the free end portion 75 to an end of the middle or center section 77 of the energy absorber 22. The transition portion 76 includes a trapezoidally shaped rearwardly-extending portion 78 that extends rearwardly to a location adjacent an outer side of the mount 39. A honeycomb-shaped box section 79 is located outward of the trapezoidally shaped portion 78, and includes a first side connected to the trapezoidally shaped portion 78, and a second side connected to the free end portion 75.

During an initial phase of an impact, impact forces from the impacting body 80 are directed along a line of force, such as line of force 35, into the end section 34. The forces are transmitted along lines 37 and 82 through the honeycomb-shaped box section 79, and along line 83 in the trapezoidally shaped portion 78. The trapezoidally shaped portion 78 engages a side of the mount 39, and slides rearwardly along the mount 39 in direction 83 as the crash progresses. During a further part of the initial phase of impact (FIG. 8), the trapezoidally shaped portion 78 and the honeycomb-shaped box section 79 compress in a manner causing the free end portion 75 to rotate rearwardly along the line 36. As this occurs, the honeycomb-shaped box section 79 compresses in a direction 82. Also, the forces associated with the impacting body 80 begin to lessen in the direction of impact (see the shortened arrow 35') and the forces are redirected along the line 39' as the end section 34 resists the corner impact. As the impact continues (FIG. 10), the free end section 75 bends further in direction 36. However, the honeycomb-shaped box section 79 rebounds in a direction 39', adding to the redirected forces 39" and still further reducing the forces 35" of the impacting body 80 against the end section 34. A result is that the impacting body 80 is "thrown" away from the vehicle by increasing redirected forces 39' and 39".

To summarize, each of the transition portions 76 initially provide a relatively low-energy absorption and further are torsionally crushed so that the enlarged free end portion 75 swings rearward and "catches" an impacted object such as a human being. The transition portions 76 then react during a further continuing part of the bumper stroke, such that the transition portions 76 provide increased energy absorption and counteractive forces such that the free end portion pushes the impacted object away both due to lateral resistive forces developed in the energy absorber non parallel a line of impact and also due to sliding of the impacted object along an inclined surface of the free end portion.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A bumper system for a vehicle comprising:

a beam for attachment to a vehicle and having a curvilinear longitudinal shape when viewed from above in a vehicle-mounted position, the beam including mounts positioned at ends of the beam;

an energy absorber engaging a face of the beam; the energy absorber having a middle section engaging the face and further having end sections that extend outwardly from the middle section and at least partially around the associated ends of the beam, the end sections each having an enlarged free end portion and a transition portion connecting the free end portion to an end of the middle section; and each of the transition portions of the end sections of the energy absorber, during a first part of a bumper stroke caused by a corner impact, being constructed to provide a relatively low-energy absorption and further being torsionally crushed so that the enlarged free end portion swings rearward and contacts an impacted object, and then during a further continuing part of the bumper stroke, the transition portion providing increased energy absorption and counteractive forces such that the free end portion pushes the impacted object away both due to lateral resistive forces developed in the energy absorber non-parallel a line of impact and also due to sliding of the impacted object along an inclined surface of the free end portion.

2. The bumper system defined in claim 1, wherein the beam includes vehicle mounts, and the transition section includes a rear wall that engages and slides on a side of one of the mounts during an impact.

3. The bumper system defined in claim 1, wherein the free end portion includes a box-shaped middle section that compresses during the first part of the bumper stroke, and that decompresses during the continuing part of the bumper stroke.

4. The bumper system defined in claim 1, wherein the beam comprises an open channel.

5. The bumper system defined in claim 1, wherein the energy absorber includes a honeycomb-shaped middle section that engages the face of the beam.

* * * * *

UNITED STATES PATENT AND TRADEMARK OFFICE
CERTIFICATE OF CORRECTION

PATENT NO. : 6,685,243 B1
DATED : February 3, 2004
INVENTOR(S) : Darin Evans

It is certified that error appears in the above-identified patent and that said Letters Patent is hereby corrected as shown below:

Column 6,
Line 4, "Figs. 34)" should be -- Figs. 3-4) --.

Signed and Sealed this

Eighteenth Day of May, 2004

JON W. DUDAS
*Acting Director of the United States Patent and Trademark Office*